April 23, 1929.　　　　S. YAMAMOTO　　　　1,710,285
APPARATUS FOR RECOVERING VOLATILE OILS FROM GASES CONTAINING THE SAME
Filed June 22, 1926
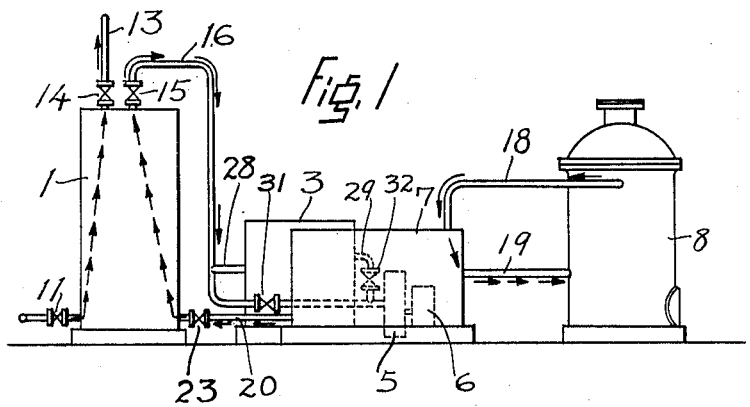
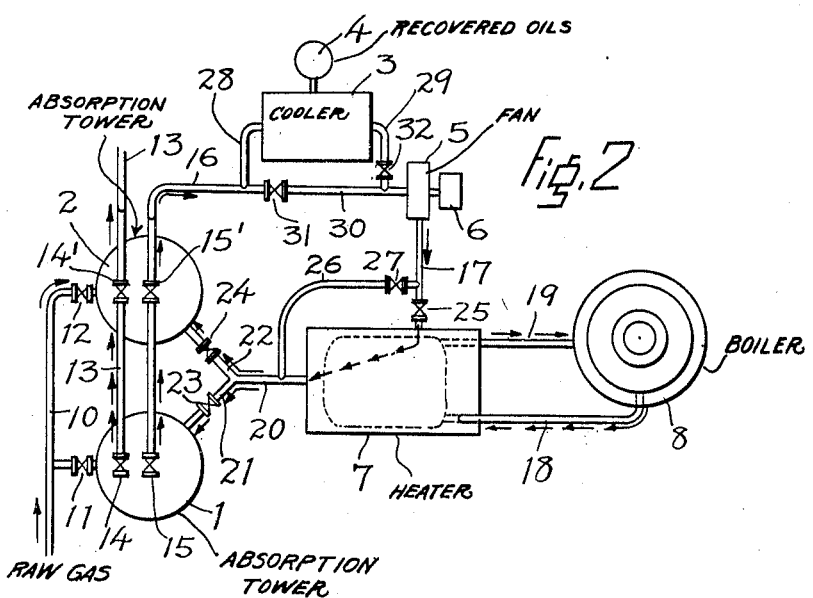
Inventor
S. Yamamoto
By　Attorneys:
Marks & Clerk Patented Apr. 23, 1929.

1,710,285

UNITED STATES PATENT OFFICE.

SAKAO YAMAMOTO, OF TOKYO, JAPAN.

APPARATUS FOR RECOVERING VOLATILE OILS FROM GASES CONTAINING THE SAME.

Application filed June 22, 1926. Serial No. 117,806.

This invention is a continuation in part of U. S. patent application Serial No. 110,014, filed on May 18, 1926, and relates to an improvement in or relating to an apparatus for collecting volatile oils adsorbed by an adsorber by passing mixed gas containing oil vapours therethrough and recovering the activity of the adsorber. The object of the invention is to most easily drive off, to liquefy and to collect the adsorbed oil vapours from the adsorber, as well as to regenerate the activity of the adsorber substantially completely.

In the accompanying drawings,

Fig. 1 shows an elevation of one type of the apparatus according to the invention;

Fig. 2 shows a plan of the apparatus shown in Fig. 1.

In the drawings, 1 and 2 are adsorption towers in which the so-called adsole, that is, an adsorbent material made from acidic clay such as Florida earth or fuller's earth according to the method described in the specification of U. S. application Serial No. 683,070, or any other suitable adsorbent material made of mineral or other substances. 3 is a cooler of an convenient type such as a surface condenser. 4 is an oil receiver to collect the oil liquefied in the cooler. 5 is a fan driven by a motor 6. 7 is a heater of any convenient type the heating medium of which is supplied from a boiler 8. The heating medium may be any convenient fluid, but oil is recommended because the temperature of the heater can be raised thereby above 300° C. very easily.

The above described parts are connected by means of pipes and cocks as follows.

10 is a pipe to supply mixed gas, that is, the so-called permanent gases such as air or methane etc. containing vapours of one or more volatile hydrocarbon oils which are naturally liquids in atmospheric condition. Such mixed gas may be for instance natural gases or coal gas etc. 11 and 12 are cocks provided in the pipe 10 to shut or open the supply of the mixed gas into the towers 1 and 2 respectively. 13 is a pipe through which the permanent gas supplied into the towers 1 and 2 and deprived of the oil vapour therein is exhausted. 14 and 14′ are cocks provided in the pipe 13 to shut or open the escapement of the permanent gas passing through the towers. 16 is a pipe connecting the towers 1 and 2 to the cooler 3. This cooler 3 is, however, not directly connected to the pipe 16, but is connected to the pipe by means of branch pipes 28 and 29 as shown, one of which, say, the latter pipe being provided in a cock 32. 31 is also a cock which is provided with a portion of the pipe 16, say 30 as shown, between the joints of the pipe 16 and the two branch pipes 28 and 29, the other end of the pipe 30 being connected to the fan 5. Thus the part 30 constitutes a by-pass for the cooler 3. 15 and 15′ are cocks provided in the pipe 16 to open or close the communication between the towers and the cooler. 17 is a pipe connecting the cooler 3 and the heater 7 and is provided with a cock 25. 18 is a pipe for supplying a heating medium from the boiler 8 to the heater 7, while 19 is the return pipe of the medium. 20 is a pipe communicating the heater 7 to the towers 1 and 2 by its branch pipes 21 and 22, the pipes being provided with cocks 23 and 24 respectively. 26 is a by-pass pipe communicating the pipes 17 and 20 directly and is provided with a cock 27.

In the working of the above described apparatus, it is assumed that in the tower 1 an adsorption operation is taking place while the tower 2 already saturated with oil vapour, is being regenerated. In this state, the cocks 11 and 14 in the tower 1 are opened while the cocks 15 and 23 are closed. In the tower 2, the cocks 12 and 14′ are closed while the cocks 15′ and 24 are opened. Further, the cock 32 in the pipe 29 and the cock 27 in the pipe 26 are closed while the cock 31 in the part of pipe 30 and the cock 25 in the pipe 17 are opened. When the fan 5 is driven, a current in a closed cycle including tower 2, fan 5, and heater 7 begins to flow and thereby the oil vapour, which was adsorbed by the adsole etc. is driven off by hot gas coming from the heater 7. As the cooler 3 is connected with the circulating current through the branch pipe 28, and also because the tension of the vapour in the cooler is very small owing to its low temperature, any oil vapour contained in the gas is continuously sucked into the cooler and is condensed therein into liquid oil so that the permanent gas serving as the driving off medium alone is passed to the fan to make further circulation in the most efficient manner in point of view of heat economy both in the cooler and the heater. The oil thus produced in the cooler is collected in the receiver 4. The permanent gas drawn by the fan from the cooler is again heated while passing through the heater 7 which again acts to drive off the oil vapour still remaining in the tower 2.

When such circulation of the driving off medium in the closed cycle is continued until all the oil vapour adsorbed in the tower 2 is driven off and collected, the cocks 31 and 25 are closed and the cocks 32 and 27 are opened so that the heater 7 is cut out of the cycle while the cooler 3 is connected thereto. Therefore, now the cycle including 2, 3, 5, but not including the heater 7 is started and the tower 2 is efficiently cooled by the cold gas. This gas contains no steam vapour and therefore does not affect the adsorption power of the adsorber stuffed in the tower 2, so that the activity thereof is entirely recovered. It can be very easily adjusted so that the time necessary for the recovering operation, that is, for driving off the oil vapour in one tower from the adsorber and then cooling it as above stated is equal or rather shorter than that necessary for completing the adsorption operation in the other. Therefore, after completing the recovering operation in one tower, when the adsorption operation is completed, the cocks 11, 14, 15, 23 and cocks 12, 14′, 15′, 24 are reversely closed or opened so that adsorption takes place in tower 2 while regeneration in the tower 1 is carried out.

It will be understood that by alternating these operations in the successive towers, a continuous working may be carried out without any trouble, although such alternating operation and accordingly number of adsorbing towers is by no means the essential of the invention.

Claims:

1. An adsorption apparatus for recovering volatile oils from gases containing the same, comprising a plurality of adsorption towers, means to selectively connect said towers with a source of gas to be treated, a heater communicating with said towers and means to selectively connect said heater to said tower, a fan adapted to circulate gases through said heater and towers, communicating means between said fan and said towers and between said fan and said heater, a by-pass around said heater whereby the heater may be cut out of the circulation system, and a cooler connected in the circuit between said towers and said fan, in which cooler oil vapours driven off are liquefied and recovered, said cooler, during the recovery period, being connected in the circulating system by a single branch pipe.

2. In an adsorption apparatus for recovering volatile oils from gases containing the same, including a circulating system comprising an adsorption tower, a fan, and a heater, in cyclic circuit, means to liquefy the volatile oils to be recovered, said means comprising a cooler disposed between the tower and the fan and means connecting said cooler to said circuit comprising a single branch pipe.

In testimony whereof I affix my signature.

SAKAO YAMAMOTO.